April 19, 1960 F. H. MUELLER 2,933,428
PLASTIC WELDING

Filed March 21, 1956 7 Sheets-Sheet 1

INVENTOR
FRANK H. MUELLER

BY Cushman, Darby & Cushman
ATTORNEYS

April 19, 1960   F. H. MUELLER   2,933,428
PLASTIC WELDING
Filed March 21, 1956   7 Sheets-Sheet 2
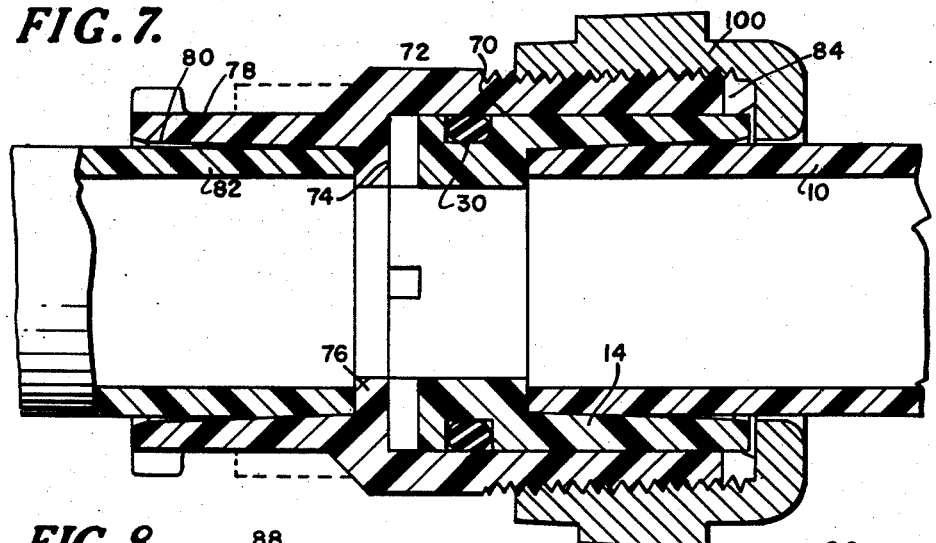
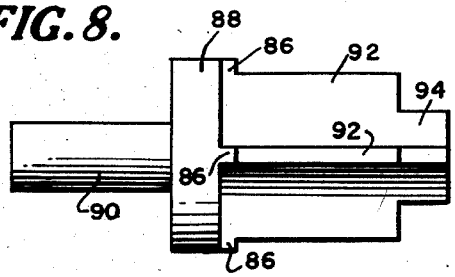
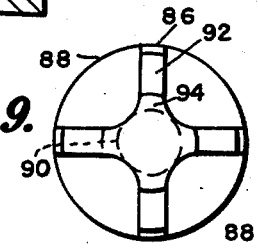
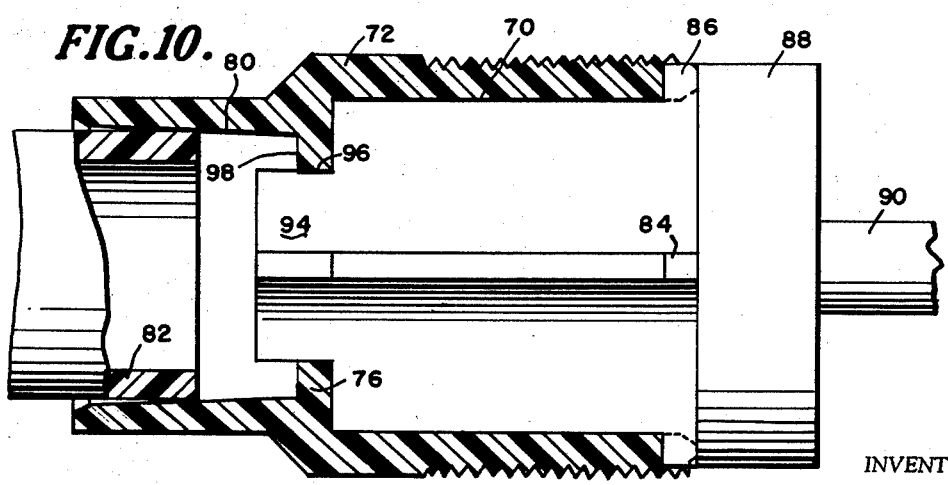
INVENTOR
FRANK H. MUELLER
BY *Cushman, Darby & Cushman*
ATTORNEYS

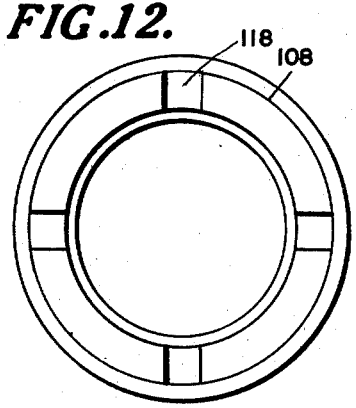
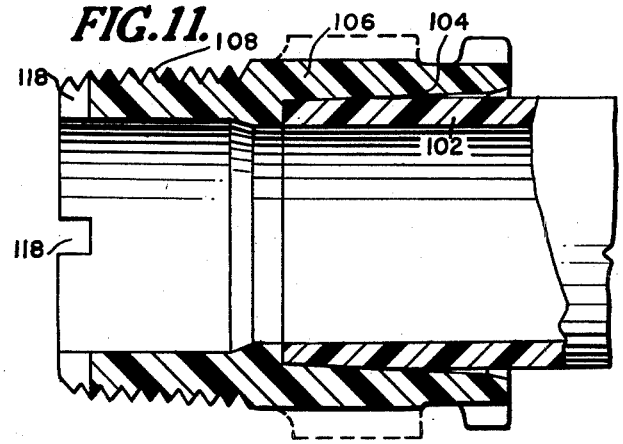
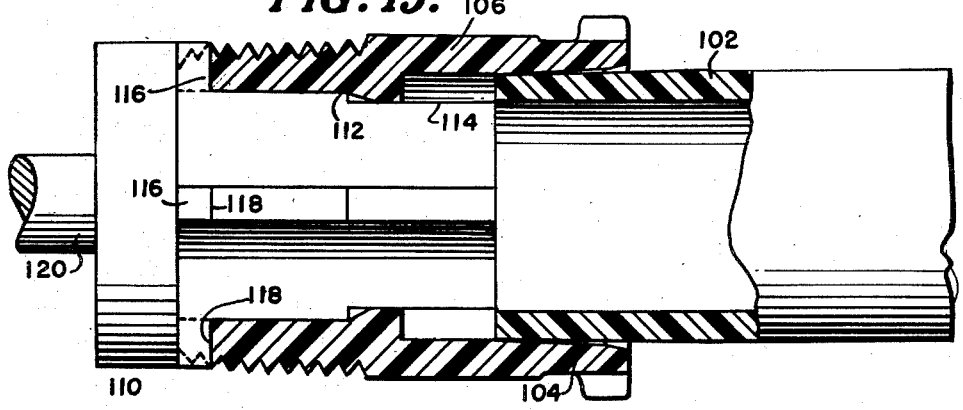
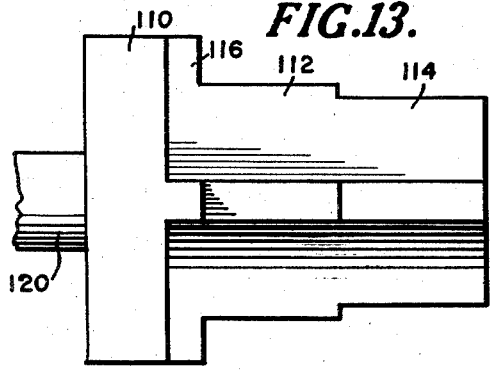
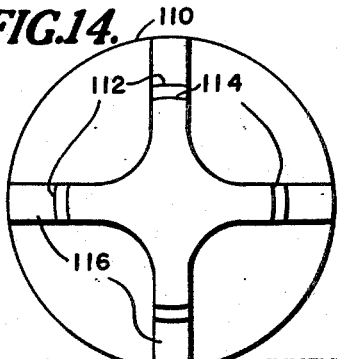
INVENTOR
FRANK H. MUELLER

INVENTOR
FRANK H. MUELLER

April 19, 1960     F. H. MUELLER     2,933,428
PLASTIC WELDING

Filed March 21, 1956     7 Sheets-Sheet 6

INVENTOR
FRANK H. MUELLER

BY Cushman, Darby & Cushman
ATTORNEYS

April 19, 1960  F. H. MUELLER  2,933,428
PLASTIC WELDING
Filed March 21, 1956  7 Sheets-Sheet 7
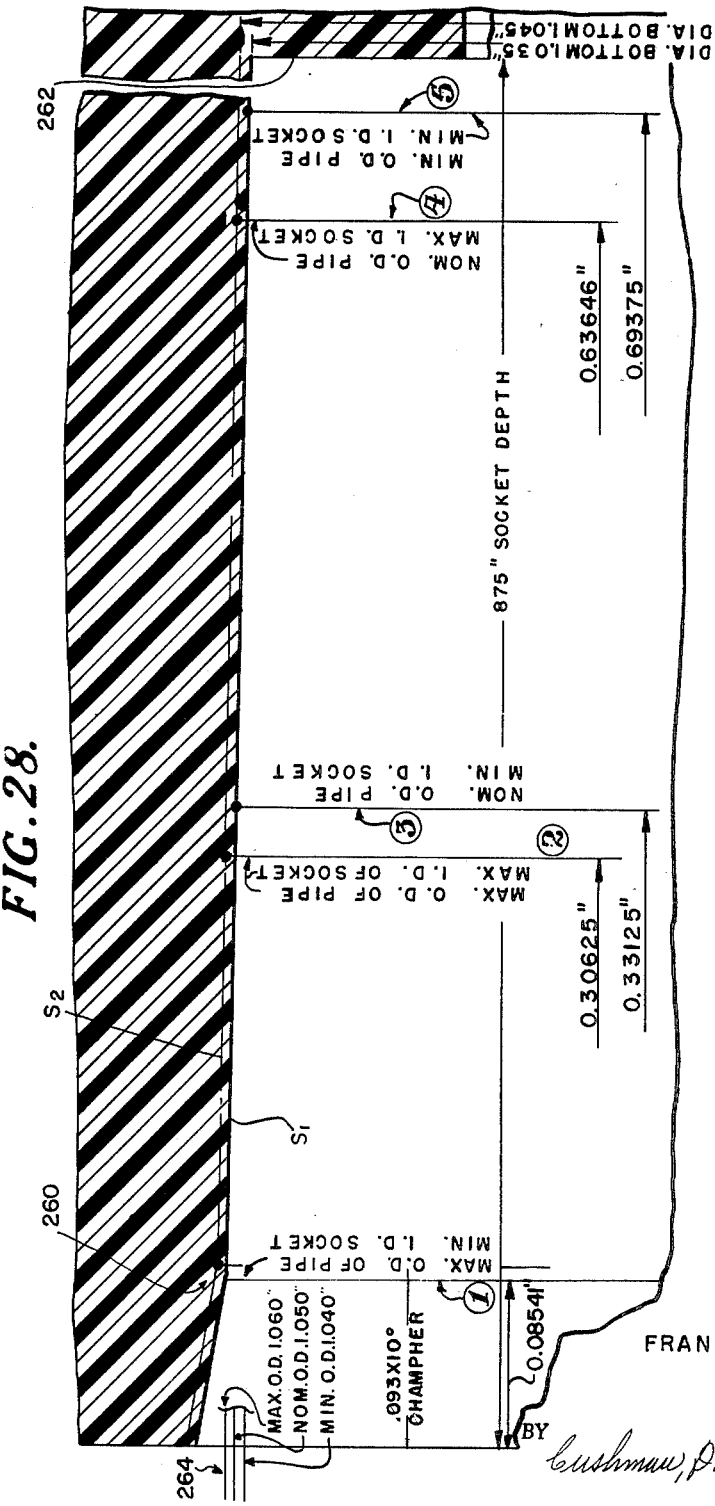
INVENTOR
FRANK H. MUELLER
BY Cushman, Darby & Cushman
ATTORNEYS

United States Patent Office 2,933,428
Patented Apr. 19, 1960

2,933,428

PLASTIC WELDING

Frank H. Mueller, Decatur, Ill., assignor to Mueller Co., Decatur, Ill., a corporation of Illinois Application March 21, 1956, Serial No. 572,863

9 Claims. (Cl. 154—116)

The present invention relates to methods and apparatus for the friction welding of plastic parts, and to friction welded products such as conduit unions and connections. The invention is importantly concerned with the welding together of such plastic parts as pipes and fittings. The invention has been successfully employed in the friction welding of the ends of plastic pipes into the tapered sockets of plastic fittings, such as collars or the like. It may be desired to attach such a collar to the end of a pipe, in order to secure thereto another length of plastic pipe, or to effect a joint between the end of a plastic pipe and a metal pipe or conduit system. In the latter case, the plastic collar to which the end of the plastic pipe is welded, may be housed and held in a metal coupling assembly, to which a metal pipe or the like of a conduit system may be in turn connected.

While I have illustrated the invention as importantly concerned with the welding of an end of a plastic pipe to a plastic fitting or the like, it will be understood that the practice of the invention may be usefully applied to the welding of various kinds of plastic fittings, to larger plastic bodies. For example, the invention may be usefully employed in welding different sizes and types of plastic fittings or connections to larger plastic bodies, such as a valve or the like. I have in mind, as one example, that various sizes and designs of flange or screw threaded plastic connecting parts may be welded to a larger plastic valve or other body, in order to rapidly adapt that valve or body for particular sizes or designs of connections which may be found on conduit systems or the like to which it is desired to attach the valve or other body.

A very important object of the invention is to provide a method of attaching the ends of plastic pipes to plastic fittings, which can be rapidly carried out in the field, and without the use of tools other than conventional devices, such as electric or pneumatic power operated drills and the like that are conveniently found in the field at such locations where conduit parts are joined with one another. The adaptability of the invention to field use, makes it possible for unskilled personnel to rapidly effect rugged plastic unions, under conditions where it may be necessary to cut lengths of plastic pipe of various sizes to the proper length to meet the situation which exists.

In one of its most useful forms, the practice of the method involves the welding of the end af a plastic pipe into an elongated tapered socket of a plastic fitting, the minimum diameter of the tapered socket being less than the outside diameter of the end of the plastic pipe. The end of the plastic pipe is moved or forced axially inwardly with respect to the socket, as the parts are rotated relatively at high speed with respect to one another. When this is done, the frictional heat generated at the surface of the plastic parts being joined, rapidly softens the plastic surfaces by local heat, and as the pipe is forced inwardly of the socket, this heat is sufficient to cause an almost instantaneous welding together of the contacting plastic material, so that a strong and rugged joint immediately results. The weld which has been described, can be effected within a matter of one or two seconds, and is immediately of strength equal or superior to welded connections made by other less convenient and more complicated methods.

With respect to present day methods for welding the ends of plastic pipe into the sockets of plastic fittings, it is the custom to provide a socket in a fitting of diameter substantially equal to the outside diameter of the pipe which is to be joined into the socket, to apply a plastic solvent to the exterior surface of the end of the pipe or to the plastic surface of the receiving socket, and then to force the end of the pipe inwardly to the desired position in the socket. Thereafter, and depending on a number of variables, including the particular plastic and solvent which is used, atmospheric conditions and the like, such a joint must be permitted to stand from one hour to four hours or more, until the solvent volatilizes or evaporates out, before any strain can be put upon the weld or union thus made.

With the present invention, and by the use of simple tools herein described, the end of a plastic pipe can be welded into an elongated tapered socket of a fitting in one or two seconds, and the welded joint thus formed is immediately available for installation and use in a system, and it will at once withstand the strains of use without awaiting the passage of time for curing out of the solvent as is necessary when forming such connections using other methods.

When I refer herein to the welding of a plastic pipe to a fitting, it will be understood that the fitting may be a separate piece formed with a tapering socket to receive the end of the plastic pipe, or it may itself constitute the integral end of another plastic pipe which is formed with such a socket for receiving the end of the plastic pipe first referred to. If the fitting is a separate plastic part, it may be arranged in a union with other metal parts and for connection with a system having metal pipes, or it may simply be formed for similar welding to another plastic pipe.

In practicing the method of the present invention, the parts are not forced directly against one another, as is the case where the ends of plastic rods or tubes, or the faces of plastic discs, are butt-welded by pressing one part directly against another while relatively rotating the parts with respect to one another. The method of the present invention is characterized by the relative axial or rubbing movement of one part along the other normal to the direction of relative frictional contact due to the rotation of one of the parts, and by the compression or axial wedging of one part within the socket of the other part as the socket is rotated relatively to the part which is being inserted into it.

A further object of the invention is to provide a method for welding the end of a plastic pipe part into the socket of a plastic fitting part in which the parts are self-centering during the welding operation. Another object is to provide such a method which makes it unnecessary to perform any special cleaning of the contacting surfaces of the parts, the method insuring self-cleaning of the contacting surfaces, and thus adapting the invention for field use under rugged conditions.

In the drawings:

Figure 7 is an axial sectional view through a coupling, showing plastic pipes connected into opposite sides of the coupling.

Figure 8 is a side elevational view of a driving tool which may be used in the forming of the coupling of Figure 7.

Figure 9 is a front face view of the tool of Figure 8.

Figure 10 is an axial sectional view, showing the driving tool in position to rotate a plastic adapter which forms one of the parts of the coupling of Figure 7.

Figure 11 is an axial sectional view through another type of plastic connection or union.

Figure 12 is an end view of one of the parts of the assembly of Figure 11.

Figure 13 is a side elevational view of a driving tool used in welding the connection of Figure 11, and Figure 14 is a front face view of this tool.

Figure 15 shows the driving tool of Figure 13, in position to rotate the plastic fitting of Figure 11.

Figure 28 is an enlarged axial sectional view, to scale, through a plastic fitting having an elongated tapering socket formed therein showing the manner in which pipes of varying outside diameters may be welded into the socket of the fitting, which socket may likewise vary in inside diameter.

Figure 29 is a diagrammatic elevational view of fixed machinery which may be employed in the welding of pipes and fittings in accordance with the invention.

Figure 1:
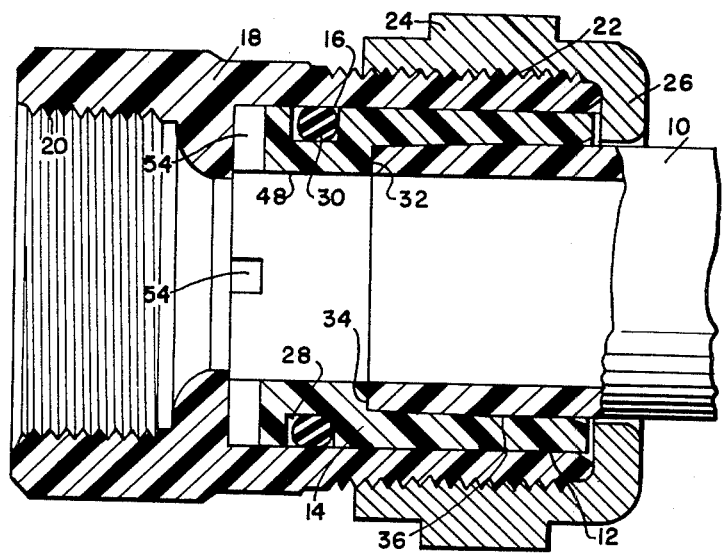
Figure 1 is an axial sectional view taken through a coupling of the present invention.
Figure 5:
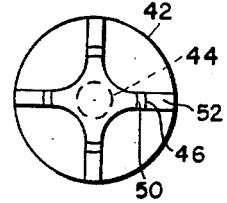
Figure 5 is a front face view of the welding tool of Figure 4.

Figure 1 shows the end 10 of a plastic pipe which has been welded using the method of the present invention, into the elongated tapered socket 12 of a plastic collar or tailpiece 14. In this embodiment of a union, the collar 14 is in turn received, and retained in the cylindrical bore 16 of a hollow metal adapter 18. The adapter 18 is interiorly threaded at one end, as at 20, for connection with the threaded end of a metal pipe of a conduit system, and the opposite end of the adapter is exteriorly threaded as at 22 for receiving a nut 24 having an end flange 26 thereon, the nut and its flange serving to retain the plastic collar 14 in the bore 16.

The collar 14 is provided with a continuous circular groove 28 substantially rectangular in cross-section as shown, and a continuous O-ring of rubber or the like is positioned in this groove to form a seal between the outside wall of the collar 14, and the bore 16 of the metal adapter 18. The O-ring is of diameter somewhat less than the axial length of the groove 28, but slightly greater than the depth of said groove, so that it will react, as is well known in the art, to pressure from within the system so as to tighten its sealing action against the surface of the groove 28 and the bore 16, in response to increased pressure within the system. The end of the plastic pipe part 10 is welded into the socket 12 of the fitting or collar part 14, by relatively rotating said parts at high speed, while forcing the end of the pipe part axially into the socket until the end surface 32 of the pipe part substantially engages the abutment wall 34 of the socket, said abutment wall being at the inner end of the tapered socket 12.

Figure 2:
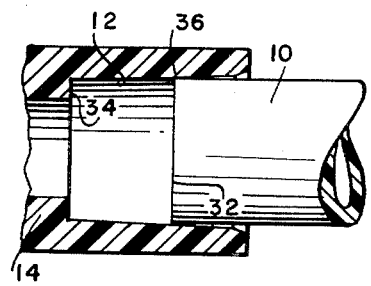
Figure 2 is a partial axial sectional view through the plastic fitting of the coupling of Figure 1, showing the end of the plastic pipe preliminarily inserted into a socket of the plastic fitting in the practice of the method of the present invention.

Plastic pipe is commonly formed and sold in lengths which are of substantially uniform exterior diameter throughout, and the method of the present invention provides for the welding of the end of such a plastic pipe, into the socket of a plastic fitting, such as the collar or tailpiece shown in Figure 1. Referring to Figure 2, it will be noted that the inner wall 12 of the socket in the part 14, tapers uniformly and gradually inwardly to the abutment wall 34, and while the end of the pipe part 10 is small enough to be inserted into the end of the socket, it is of diameter slightly greater than that of a substantial inner part of the socket, whereby it will contact the wall of the socket at a point 36, when the pipe is inserted into the socket with normal pressure as can be applied by hand.

Thereafter, and in accordance with the method of the invention, the fitting part 14 is rotated at high speed relatively to the pipe part 10, while the latter is forced axially into the socket substantially until it contacts the abutment wall 34 of the socket. As the end area of the pipe part 10 is forced into the socket beyond the contact point 36, and while the parts are rotated relatively at high speed with respect to one another, the frictional heat generated locally at the contacting surfaces of the parts softens the plastic material to a state that the plastic materials of the parts intimately join with one another and then congeal into a welded condition. At about the time that the end of the pipe part 32 contacts the abutment wall 34 of the socket, the plastic materials are so intimately joined with one another that the pipe part 10 will commence to turn at high speed with the rotating fitting part 14, the union or weld being strong enough to overcome such restraining force against rotation as can be applied by hand to the pipe part 10 as it is being forced axially into the socket. The area of the weld is of substantial length, extending within the socket from the contact point 36 to the inner end thereof, and extending throughout a corresponding length outwardly from the end of the pipe part 10. As the pipe part is moved axially inwardly of the socket, that tapered area of the socket inwardly of the contact point 36 is heated and softened by friction, and the outside wall of the pipe part 10 outwardly of the end thereof, is correspondingly softened by frictional heat as the parts are moved axially with respect to one another, so that the welding together of the materials of the parts throughout a substantial length of both the socket and the end area of the pipe, is effected.

I have found that such a weld can be made by rotating the fitting part 14 with relation to the pipe part 10, while the parts are moved axially with respect to one another, at a speed of approximately 900 r.p.m., using an ordinary electric or air drill attached to an appropriate tool which suitably engages the fitting part 14 as hereinafter described, to rotate same. I have further found that such a weld can be made in a matter of one or two seconds, following the procedure described, and that a weld so made between the pipe and fitting parts is of such strength that it will immediately withstand all of the stresses which it must face in use, without the requirement that the union be permitted to stand for any period of time, as is necessary to permit volatilizing of a solvent which is used to secure the parts together when using other methods.

Figure 4:
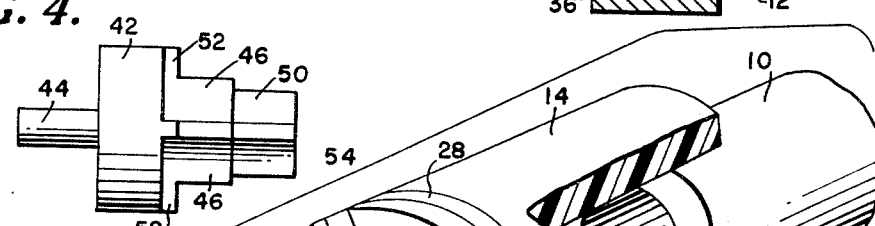
Figure 4 is a side view of the connecting tool which is used in Figure 4, to rotate the plastic fitting part during the welding operation.
Figure 3:
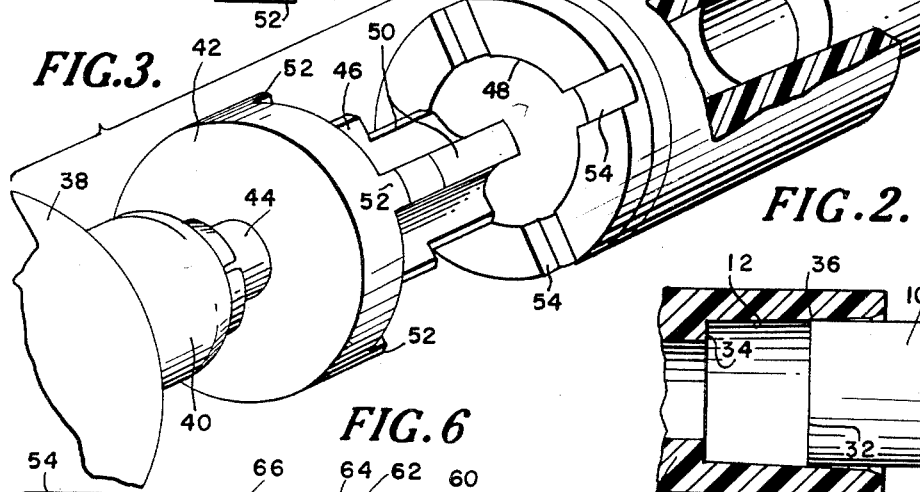
Figure 3 is a perspective view showing the plastic pipe and fitting in position for engagement by the machine which relatively rotates these parts with respect to one another during the welding operation.

Figure 3 diagrammatically illustrates the simple assembly of parts which are employed in carrying out the method of the invention. In this figure, 38 designates a conventional electric or air drill having a chuck 40 to which is connected a driving tool 42 of the type shown in Figure 4. This driving tool has a spindle 44 extending from one end thereof, and which is formed to enter and be gripped by the chuck 40 of the drilling machine 38. The tool 42 further comprises a main substantially cylindrical body which carries the spindle 44 extending rearwardly from one face thereof, and it has four radially extending web portions 46 extending forwardly from the opposite face thereof and which are of exterior diameter substantially equal to the reduced bore 48 of the fitting part 14 at the inner end of the socket 12. There are further and reduced web portions 50, constituting continuations of the web portions 46, and which are of external diameter to freely enter the interior of the end of the pipe part 10, to assist in centering and supporting the pipe part and to ream out any excess melted plastic and foreign matter as may be necessary.

The main body of the tool 42 is provided on the forward face thereof with four equally spaced forwardly extending driving lugs 52, which are of size to enter correspondingly arranged grooves on the end of the fitting 14 opposite from its socket 12.

When it is desired to make a weld between plastic fitting part 14 and plastic pipe part 10, the driving tool 42 is connected to a drilling machine as shown in Figure 3, and the webs 46 of the driving tool are inserted into the bore 48 of the fitting part 14 until the lugs 52 of the driving tool enter the slots 54 of the fitting, thus completing the driving connection. Thereafter, the end of a plastic pipe 10, cut to the desired length, is inserted by hand into the socket 12 of the fitting part, until it reaches the contact point 36, as shown in Figure 2. With the parts in this position, one operator may start the drilling machine, to turn the plastic fitting at high speed. At the same time, the plastic pipe part 10 is held by hand against rotation, while being manually forced inwardly and axially of the socket, whereby the fitting is rotated relatively at high speed with respect to the pipe, while the pipe is forced a substantial distance axially into the socket, the materials of the parts being in frictional contact with one another over an increasing area as the pipe part is forced inwardly. At about the time the end of the pipe part reaches the abutment wall 34 of the fitting part, the local frictional heat generated will have caused the materials of the parts to bond with one another into an effective weld. When this condition is reached, the pipe part will be caused to turn against such restraining force as can be applied by hand as the pipe part is forced into the socket. The resulting turning movement of the pipe part and its contact with the abutment wall 34 will indicate that the pipe part has been fully inserted and has been effectively welded into the socket. As the end of the pipe part nears the abutment wall 34, the reduced web portions 50 of the driving tool 42 will enter the end of the bore of the pipe part 10. These web portions may serve to remove any excess of plastic material or foreign matter which may have been extruded into the bore of the fitting and pipe parts, as well as serving to center and support the pipe part in the socket. It will be understood that the gradual tapering form of the socket, serves to provide a self-centering action, as the pipe is forced into the socket and serves to wedge the pipe with increasing radial pressure as the weld is effected.

As previously mentioned, the method of the present invention is well adapted for use in the field, and the plastic parts need not be cleaned or similarly prepared for the practice of the method, for the contacting surfaces of the parts are self-cleaning, in their action on one another. Referring to Figure 2, as the end of the pipe 10 is forced inwardly of the socket, any foreign matter on the tapered surface of the socket inwardly of the contact point 36 is forced inwardly by the end of the pipe to the vicinity of the abutment wall 34, and it may be extruded radially inwardly to the bore of the fitting 14. Similarly, any foreign matter on the exterior of the end area of the pipe 10 is caused to move outwardly along the wall of said pipe as increasing areas of the pipe contact and weld with the wall of the socket 12.

Figure 6:
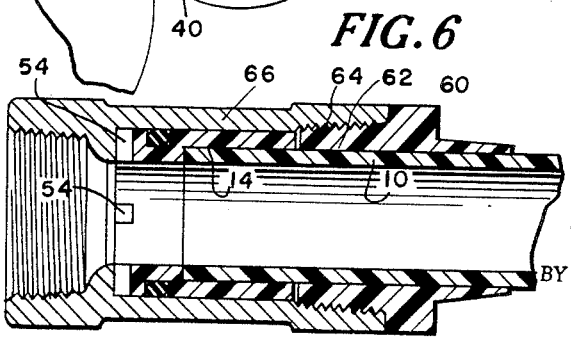
Figure 6 is an axial sectional view through a modified form of coupling for plastic pipe, similar to that of Figure 1.

Figure 6 discloses a conduit connection in all respects identical with that of Figure 1, except that a plastic nut 60 of the form shown is used in place of the nut 24 of Figure 1, this nut having a threaded end portion 62 which engages interior threads 64 on the end of the metal adapter 66 of modified construction as shown.

In Figure 1, as described, a plastic fitting or tailpiece is welded to the end of a plastic pipe, and these parts thus welded are assembled into a metal adapter or coupling, for connection with a metal pipe or part of a conduit system. The joined tailpiece and plastic pipe may, however, be assembled into a plastic adapter, which is in turn formed to similarly connect with another plastic pipe, as in the arrangement shown in Figure 7. In this figure, the end of the plastic pipe 10 is shown welded in accordance with the invention into the tailpiece or fitting 14, and this tailpiece is inserted into the bore 70 of an adapter 72 which is itself formed of plastic material. The adapter 72 is hollow throughout, having the bore 70 with an end wall 74 formed on the interior flange 76. The opposite end 78 of this plastic adapter is formed with an elongated inwardly tapering socket 80 to receive the end of another plastic pipe 82, which is welded into this bore in the same manner as described in connection with Figures 1 through 6, and using driving tools of similar design.

In constructing the coupling or union of Figure 7, the plastic pipe 10 is welded in the manner previously described, into the socket of the fitting or tailpiece 14, and which is formed with the exterior groove 28 and the O-ring 30 as previously described. The plastic adapter 72 at the end opposite from its socket 80 is formed with four circularly spaced slots 84, which are of arrangement and size to receive four lugs 86 on the forward face of the main cylindrical part of a modified tool 88, shown in Figures 8 and 9. This tool has a spindle 90 to enter the chuck of the drilling machine, for rotating the tool at high speed, and four circularly spaced and forwardly presented webs 92, which have reduced extensions 94 of size to pass through the opening 96 in the interior circular flange 76 of the plastic adapter 72.

With this construction, and as shown in Figure 10, the tool 88 is inserted into the bore 70 of the plastic adapter 72 until the lugs 86 engage in the slots 84 at the end of the adapter. The end of the plastic pipe 82 is inserted into the elongated tapered socket 80 as previously described, with the spindle 90 of the tool 88 held in the chuck of the drilling machine, as was described in connection with Figure 3. The drilling machine is then operated to turn the tool 88 and the adapter 72, at high speed, and the plastic pipe 82 is forced axially into the socket 80, while being manually restrained against rotational movement, until the end of the pipe substantially contacts the abutment wall 98 of the socket. At this point, the plastic materials will have been softened by frictional heat, throughout the whole area of contact, and an effective weld will have resulted at the time the pipe 82 commences to turn against manual restraint.

When the pipe 82 has thus been welded into the socket 82 of the adapter 72, and as shown in Figure 7, the previously welded assembly of the pipe 10 and the fitting or tailpiece 14 with the O-ring seal thereon, is inserted into the bore 70 of the adapter 72, and secured therein by the nut 100 which is threaded onto the outer end of the adapter 72.

Figures 11 and 12 disclose a simple plastic union, in which a plastic pipe 102 is welded as previously described into an elongated tapering socket 104 of a simple plastic adapter 106 which is provided with plastic threads 108 at its opposite end to connect with interior threads formed on the end of another and larger plastic pipe or metallic fitting which it may be desired to connect as a continuation of the plastic pipe 102. Of course, the adapter 106 could be formed with interior plastic threads in place of threads 108 if it is desired to connect with a smaller plastic pipe. As indicated, the end of the plastic pipe 102 is welded into the socket 104, in accordance with the methods previously described. In order to rotate the adapter 106 with respect to the pipe 102, during the welding operation, a tool 110 of special design as shown in Figures 13 and 14 is employed. This tool is provided with forwardly presented web portions 112 and 114 and with circularly spaced lugs 116, the said lugs being of size and arrangement to fit in the circularly spaced slots 118 in the end of the adapter 106 opposite from the socket 104. Figure 15 shows the tool 110 inserted into the adapter 106, for driving same in performing the high speed welding operation as described, this tool having a spindle 120 adapted to be received in the chuck of the drilling machine for rotation thereto.

Figure 16:
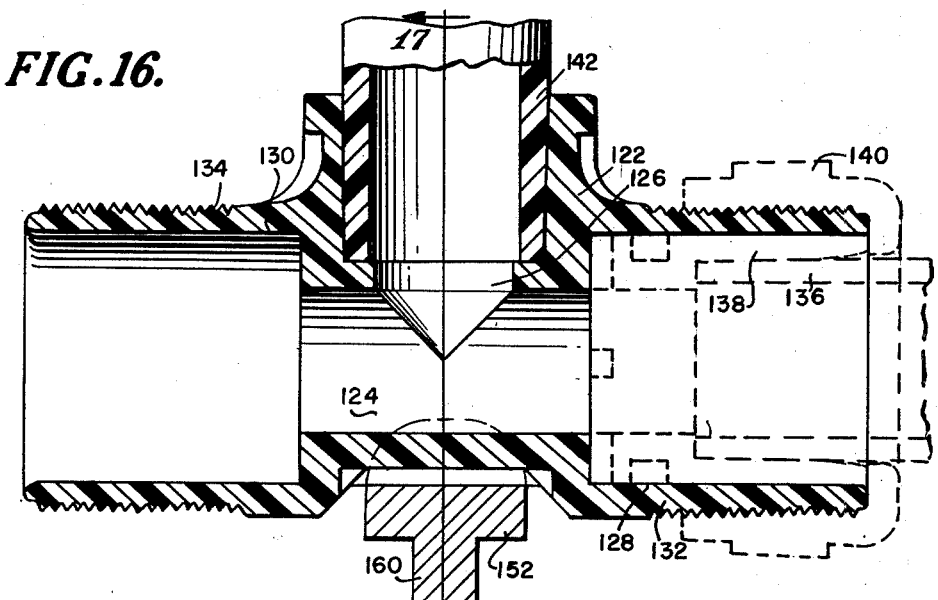
Figure 16 is an axial sectional view through another form of plastic connection or union, where three plastic pipes are connected to a plastic fitting.

Figure 16 shows a T-fitting 122 in which three plastic pipes may be connected in accordance with said practices of the invention. This fitting, designated 122, is made of plastic and has a horizontal passage 124 extending entirely therethrough, as well as a vertical passage 126 extending outwardly leading from the horizontal passage 124. At its opposite ends the passage 124 is provided with enlarged counterbores 128 and 130. These counterbores are formed respectively in extending nipples 132 and 134 of the fitting 122, and are exteriorly threaded to receive coupling nuts as illutsrated in dotted lines on the right hand nipple 132, whereby the nipples may receive the assemblies of the plastic pipes with their welded tailpieces, as previously described in connection with Figure 1. As shown in dotted lines in the right hand nipple 132 of Figure 16, an assembly of plastic pipe 136 and the tailpiece or fitting 138 welded thereto, as previously described, is retained in the counterbore 128 by a nut 140. It will be understood that a similar assembly comprising an identical plastic pipe and tailpiece may be secured in the counterbore 130 at the opposite side of the fitting 122, after the fitting is welded to a third plastic pipe 142 as hereinafter described.

Figure 17:
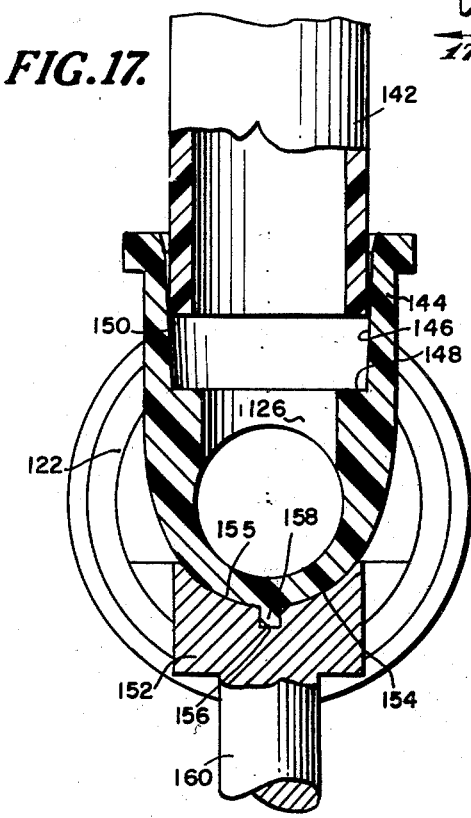
Figure 17 is a vertical sectional view along the line 17—17 of Figure 16 showing the manner of use of another form of special driving tool, to rotate the plastic fitting with relation to one of the plastic pipes.

Referring to Figure 17, there is a third nipple 144 which extends from the fitting at right angles to the nipples 132 and 134. This nipple is formed with an elongated tapering socket 146 of the type previously described, said socket terminating in an abutment face 148. The end of the plastic pipe 142 is shown inserted by hand into the socket 146, up to the point of contact 150, the socket portion below this point of contact as viewed in Figure 17 being of inside diameter less than the outside diameter of the plastic pipe 142.

Figure 19:
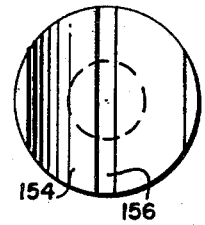
Figure 19 is a front face view of the tool of Figure 18.
Figure 18:
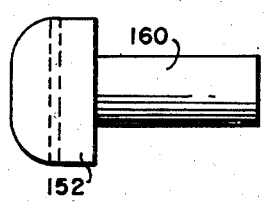
Figure 18 is a side elevational view of the special driving tool used in rotating the plastic fitting as shown in Figure 17.

In order to rotate the fitting 122 for welding connection with the plastic pipe 142, a special tool of the type shown in Figures 18 and 19 is employed. This tool comprises a head 152 having a semi-cylindrical forward face 154 which fits against the lower cylindrical outside face 155 of the fitting 122, at the center thereof, as viewed in Figure 16. The forward face of this tool is further provided with a central slot 156 which fits upon a protruding lug 158 on the lower cylindrical surface of the fitting 122.

With the parts arranged as shown in Figure 17, and it being understood that plastic pipe assemblies have not yet been fitted into the nipples 132 and 134, the chuck of a drilling machine is connected with the spindle 160 of the driving tool, and the entire fitting 122 is thereby rotated at high speed, while the plastic pipe 142 is forced axially into the socket 146 until its end substantially contacts the abutment face 148 of said socket, thus welding the end of the plastic pipe 142 into the socket of the fitting 122, in accordance with the method as previously described. Thereafter, welded assemblies of the plastic pipe and tailpiece, as shown in dotted lines at 136, 138 in Figure 16, are fitted into and secured into each of the counterbores 128 and 130, and retained therein by nuts 140, to form a three-way connection or T, with plastic pipes leading from each of the three nipples thereof.

Figure 20:
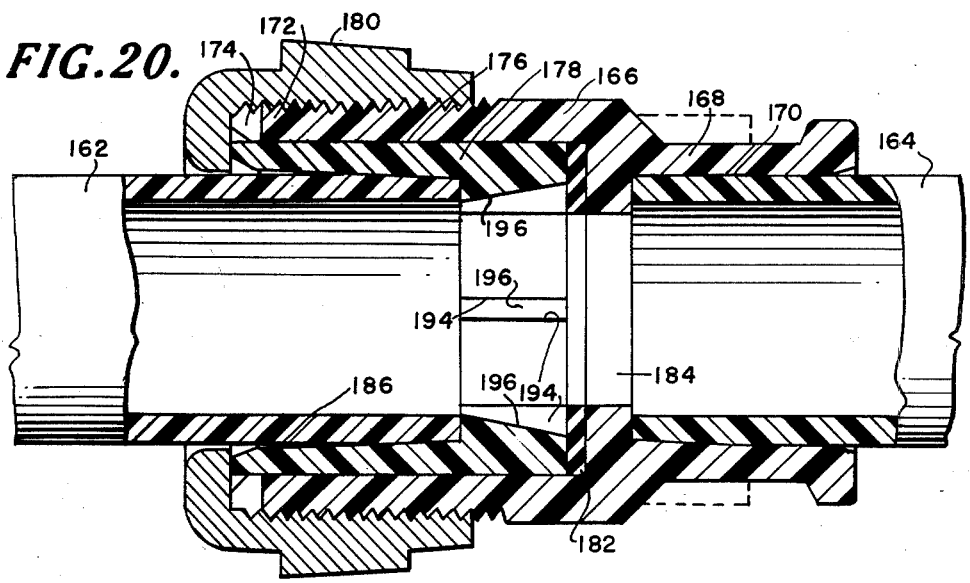
Figure 20 is an axial sectional view of still another type of union for connecting the ends of plastic pipes into the union.

Another form of the invention is shown in Figure 20, for connecting oppositely extending plastic pipes 162 and 164, into the opposite ends of a hollow plastic fitting 166. The fitting 166 is provided with a nipple 168 having therein a tapered socket 170, into which is welded the end of the plastic pipe 164, in accordance with the methods as previously described. The fitting 166 has an oppositely extending and enlarged nipple 172, which is exteriorly threaded, and at the end of this nipple there are circularly spaced slots 174, corresponding with the slots 84 in Figure 7, whereby the plastic pipe 164 may be welded into the socket 170 by rotating the fitting 166 at high speed, in the same manner as is described with respect to the welding of the plastic pipe 82 in Figure 7, and using a tool having lugs to engage the slots 174, of a design similar to that shown in Figure 8.

The nipple 172 of the fitting 166 is provided with an enlarged counterbore 176 which is adapted to snugly receive a tailpiece 178, of special design, which in turn has been welded onto the end of the plastic pipe 162, in a manner hereinafter described. The tailpiece 178, after it has been attached to the end of the plastic pipe 162 is retained in the counterbore 176 by a nut 180 secured to the exterior threads of the nipple 172, the tailpiece being forced inwardly against a rubber gasket 182 disposed at the inner end of the counterbore 176, and surrounding the central passage 184 of the fitting.

Figure 22:
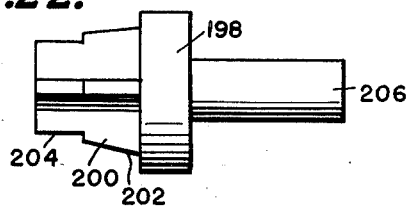
Figure 22 is a side elevational view of the special tool as shown in Figure 21.
Figure 23:
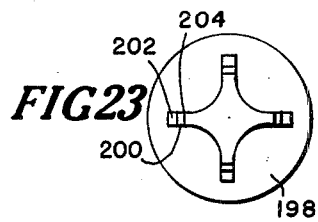
Figure 23 is a front face view of this same tool.
Figure 21:
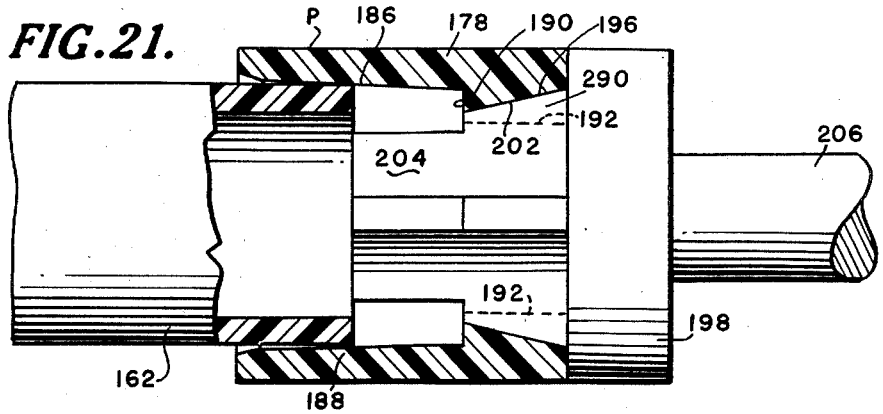
Figure 21 is a side elevational view, showing a special driving tool in position to rotate the plastic fitting of Figure 20, while it is being welded to one of the plastic pipes.

Referring to Figure 21, the tailpiece 178 is provided at one side of its through passage with an elongated tapering socket 186 and the end of the plastic pipe 162 is shown manually forced into this socket to the point of contact, as at 188. The socket of the tailpiece 178 terminates in an abutment face 190 and has a central reduced opening 192 extending from its opposite end and this opening is provided with four circularly spaced slots 194 having inwardly tapering bottom walls 196, to provide a driving connection with the special design of driving tool shown in Figures 22 and 23. This special tool has a short cylindrical head 198 and four circularly spaced webs 200, the outside faces 202 of which are of inwardly tapering form, corresponding with the bottom walls 196 of the receiving slots 194 (Figure 20) of the tailpiece 178. The driving tool is further provided with reduced forwardly extending webs 204 which may enter the open end of the plastic pipe 162 when the pipe is forced axially inwardly of the socket 186 during the high speed frictional welding operation. The driving tool is provided with a spindle 206 for connection with the chuck of a drilling machine, in order to rotate the tailpiece 178 during the welding operation and while the plastic pipe is being forced axially inwardly of the socket 186.

Figure 24:
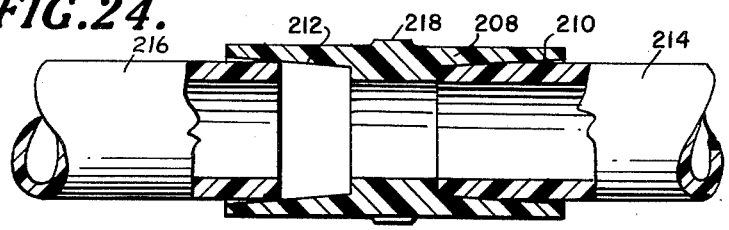
Figure 24 is an axial sectional view through a simplified coupling, comprising a plastic fitting to which is attached the ends of two plastic pipes.

Figure 24 shows a simple union which may be made in accordance with the invention. It comprises plastic fitting 208 having sockets 210 and 212 on opposite sides thereof into which plastic pipes 214 and 216 are frictionally welded, in accordance with the invention. The plastic fitting is shown generally equipped with external means, such as circularly arranged and spaced teeth or projections 218, which can be employed for the application of power to turn the fitting with respect to either one of the plastic pipes during the performance of the welding method, or the fitting could be turned with such means while the plastic pipes 214 and 216 are simultaneously being inserted in their respective sockets of the fitting. The pipes are restrained against rotation until the weld is effected, as previously described. Of course, the fitting 208 could be held against rotation, with a restraining force, and the plastic pipes 214 and 216 could be rotated at high speed with suitable means while being inserted into their sockets, in order to effect the welds.

Figure 25:
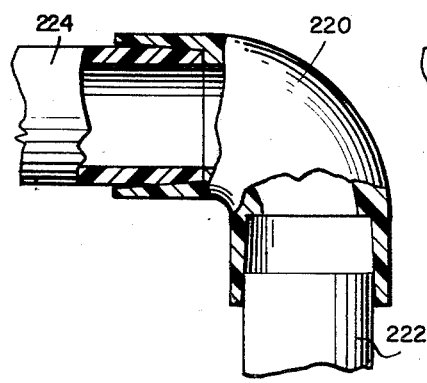
Figure 25 is a similar partial sectional view of a simple L-fitting, to which are welded the ends of two plastic pipes.

Figure 25 shows a simple L-fitting 220, made of plastic, into the sockets of which the plastic pipes 222 and 224 are welded, in accordance with the method of the invention. In this instance, the fitting could be rotated at high speed while welding one pipe, for instance pipe 224, and thereafter the pipe 222 could itself be rotated at high speed while being axially inserted into its socket in the plastic fitting 220.

Figure 26:
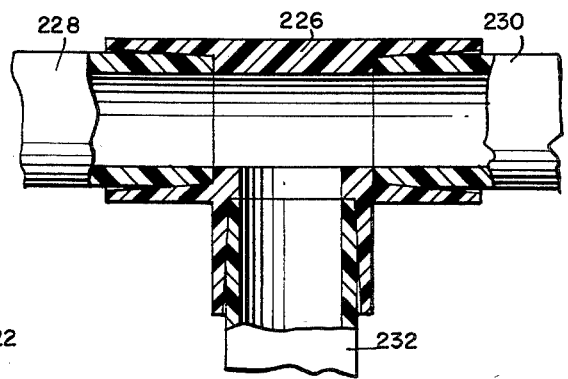
Figure 26 is an axial sectional view showing a simple T-connection comprising a plastic fitting, and three plastic pipes welded thereto.

Figure 26 discloses a simple T-fitting 226 made of plastic into the sockets of which are welded, by the practice of the invention, the plastic pipes 228, 230 and 232.

It will be understood that in all of these simple embodiments of Figures 24 through 26, the sockets in the plastic fittings are of the kind previously described, and the plastic pipe is inserted to the contact point as in Figure 24, and then forced inwardly to contact with the abutment face at the bottom of the socket, while the parts are relatively rotated at high speed with respect to one another, all as described in connection with the other embodiments of the invention.

Figure 27:
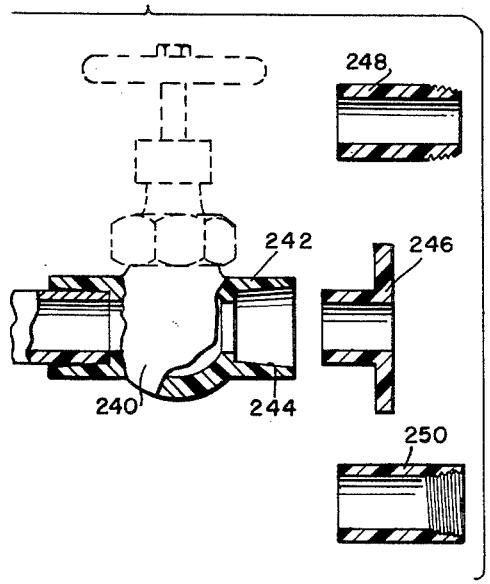
Figure 27 is a partial sectional view of a plastic body, such as a plastic valve, showing the manner in which various connecting fittings may be welded thereto in accordance with the invention.

Figure 27 shows a useful application of the invention to a larger body, such as a valve having a body 240 made of plastic. This body is formed with a nipple 242 having the elongated tapered socket surface 244 as previously described. Any one of the connecting elements 246, 248, and 250 could be secured to this valve body as conditions dictate, in the field. Connection 246 represents a flange connection, 248 represents a male threaded connection, and 250 represents a female threaded connection. Each of these connections is provided with a tubular end or pipe part which can be inserted into the socket 244 of the body, to the point of contact, and then welded therein by rotating the part at high speed with respect to the body, while the pipe part is being forced axially into the socket, all as previously described.

With this arrangement, a valve or other plastic body, such as 240, could be formed of standard design, and thereafter, when the user is faced with the problem of connecting it into a particular system, he could use any of the previously supplied plastic connections 246, 248 and 250 as the conditions at the site of installation dictate. Obviously, other types of connections could be initially fabricated and supplied, thus providing great flexibility in the installation of the body 240, in various systems which are encountered.

The plastic materials which we prefer for the practice of the invention, and which we have successfully used, are polyvinyl chloride (P.V.C.) and cellulose acetate butyrate (Tenite Butyrate), (Tenite II), but other thermoplastics which may be useful in practicing the invention are cellulose acetate, cellulose nitrate, nylon, polystyrene, polythene, and polyvinylidine chloride.

Polyvinyl chloride is an extruded type of thermoplastic now readily available for use. It has a high coefficient of expansion as compared with metal, and like other plastics, presents some problem in forming a seal along its surface. However, the arrangements disclosed in this application have overcome the disadvantages, and such unions as are shown in Figure 1 have been successfully made and tested to hold very high internal pressures.

In using the preferred plastic materials, it is noted that the heat generated by friction remains at the surface of the plastic and does not readily pass off to surrounding areas, so that a welding heat is reached almost instantaneously, when one part is forced into the socket of the other part, as the parts are rotated with respect to one another. These plastics will soften at about 250° F., and the materials of the respective parts will intimately intermingle with one another and will at once congeal to form a rugged union. When the forward end of the pipe part is in contact with the tapered wall of the socket, it melts appreciably during the relative rotational and axial movements, and the reduced tapered wall of the socket inwardly of the point of contact is also appreciably softened, so that the materials intermingle with one another not only at the end of the pipe part, but also for a substantial distance along the outside surface of the pipe as the latter is wedged with increasing pressure into the socket. It only requires a matter of seconds to weld the parts by forcing the pipe relatively with respect to the long and gradually tapering socket, and the end portion of the pipe creates a melting friction as it is thus moved along. The plastic is not subjected to excessive heat for any prolonged period, as the welded union is completed in a matter of one or two seconds. The actual end of the pipe is subjected to the frictional heat for a longer period of time than that part of the outer wall of the pipe which extends rearwardly from its end. This rearwardly extending part of the pipe is only subjected to high heat for a relatively short period of time, but sufficient to form the weld as previously described. The abutment face or stop shoulder at the end of the socket is so positioned that when the pipe has been moved with respect to the socket until it engages this face, the desired welding action has already taken place. The long gradual taper of the socket serves to properly round and center the pipe. Plastic pipes now available on the market are often not truly circular in cross-section, and in the practice of this method, the tapered socket serves to round the plastic pipe, and to properly center same as it is being welded. The appreciable axial and wedging movement of the parts, in rubbing contact with one another, is of great importance in the successful practice of the method.

I have found that the simplest way to perform the method is to insert the pipe part into the socket, while restraining the pipe part against rotation by hand. When the pipe has been inserted fully into the socket, the weld causes the power driven fitting to turn the pipe in the hand, against the normal restraining force which can be exerted by hand. It would be possible, of course, to use a preloaded chuck on the power-operated drill or the like, which would discontinue the turning movement when a proper bond is effected.

The invention can be practiced where there is considerable difference in the size of the socket, and the size of the pipe. Figure 28 is a greatly enlarged axial sectional view taken through the socket of a fitting or tailpiece, into which a plastic pipe is to be welded, for instance such a fitting as is designated at 14 in Figures 1 and 3. The socket has a flared outer end, terminating at about the point designated by the arrow extending from the numeral 260. As plastic fittings may vary in size, when formed, and within certain tolerances, I have indicated the expected minimum diameter of such a socket by the elongated gradually inwardly tapering surface $S^1$, and the expected maximum diameter by the corresponding tapered surface $S^2$, both of these surfaces extending from the inner end of the flared portion, to the base or abutment face of the socket designated by the numeral 262.

Socket surface $S^1$ tapers from an internal diameter of 1.060 inches, at its mouth, to an internal diameter of 1.035 inches at its base, while socket surface $S^2$ tapers from a diameter of 1.070 inches at its mouth to a diameter of 1.045 inches at its base. As previously indicated, the mouth of the socket in stating these dimensions is deemed to be at the inner end of the flared or belled-out portion, as indicated by the lead line from the numeral 260.

At the left hand side of Figure 28, three lines generally designated by the arrow from the numeral 264 indicate the outer diameters of maximum, nominal and minimum size pipes, which it might be desired to weld into a fitting having a socket which would vary in diameter, from that of surface $S^1$ to that of surface $S^2$. The size of plastic pipe is controlled by the extrusion process used, and there may be a considerable variation in the outside diameter of different pipes of a given or rated nominal size. As indicated in Figure 28 at the numeral 264, the nominal size of pipe available for insertion into this socket is indicated as 1.050 inches outside diameter. It may vary, from a minimum of 1.040 inches outside diameter, as indicated, to a maximum of 1.060 inches outside diameter as indicated. Figure 28 is drawn to scale to show how the method of the invention may be practiced with fittings having sockets and with pipe sizes which may vary in diameter, to some considerable extent. So long as there is a substantial length of permissible axial movement for the end of the pipe, after it makes contact with the wall of the socket, and during the high speed relative rotation which causes the welding action, a satisfactory weld can be made.

Referring still to Figure 28, the line designated by the circled numeral 1 shows where a pipe of maximum diameter would, upon manual insertion into the socket, contact the wall of a socket of a minimum interior diameter. In this instance, such contact is at the mouth of the socket $S^1$. When this pipe is forced axially inwardly of the socket while the parts are rotated at relatively high speed with respect to one another, the area of welding would be quite long, being of a distance from line 1 to the base 262 of abutment face of the socket.

Similarly, the circled numeral 2 indicates the point where a pipe of maximum outside diameter would contact the wall of the socket $S^2$ of maximum inside diameter upon being manually inserted therein. As further indicated, circled numeral 3 indicates the point where a pipe of nominal outside diameter would first contact the wall of the socket $S^1$ of minimum interior diameter. Similarly, circled numeral 4 designates the point where a pipe of nominal outside diameter would contact the socket $S^2$ of maximum inside diameter, and circled numeral 5 indicates the point where a pipe of minimum outside diameter would contact the wall of socket $S^1$ of minimum interior diameter.

Legends on Figure 28 give the distance from each point of contact to the extreme outer end of the socket, thus indicating the distance which pipes of the various sizes, fitting in sockets of the different sizes, would be axially moved while the surfaces to be welded are in contact with one another, and are being rotated at high speed relatively to one another. Of course, a pipe of maximum outside diameter will be forced the greatest axial distance, while being in welding contact with the socket, while the pipe of minimum outside diameter travels only a relatively short distance in contact with the wall of the socket during the welding operation. The pipes which have a true diameter of the nominal rated size, travel a substantial distance in contact with the wall of the socket, while in welding contact therewith. Figure 28, including the dimensions thereon, indicates that the process can be satisfactorily carried out, to secure effective welds, even though there be substantial variations in the diameters of the sockets and pipes which are obtained on the market.

Figure 29 is a diagrammatic view generally illustrating the type of apparatus which might be employed to weld lengths of pipe to fittings at a factory site. In this view, 266 indicates a fixed bed on which is mounted for longitudinal movement toward and from one another, a pipe supporting housing 268, and a machine 270 for supporting the fitting which is to be welded to the pipe. The top surface of the housing 268 is provided with any appropriate means such as straps 272 to hold a length of the plastic pipe 274. If it is desired to positively rotate the pipe, a gear 276 may be strapped to the outer end thereof, and this gear meshes with a gear 278 carried on a shaft 280, which shaft may be driven from a suitable motor or the like, within a housing 268. A hydraulic system including a cylinder 282 and a piston 284 connected with the housing 268, may be used, with appropriate controls, to move the housing and the plastic pipe inwardly and outwardly with respect to the machine 270.

The machine 270 may comprise a housing having any suitable power means therein, such as an electric motor as found in an ordinary drilling machine, and is provided with a chuck 286 which grips the spindle of a tool 288 which in turn engages the plastic fitting 290 to rotate same at high speed, all as previously described. The machine 270 may also be provided with a suitably controlled hydraulic system, including cylinder 292 and a piston 294 connected to the machine, so that it may be moved inwardly and outwardly with respect to the housing 268, along the fixed bed 266.

Figure 29 is intended to illustrate that apparatus may be provided for rotating either the fitting 290 or the pipe section 274, and that either the pipe part or the fitting part may be moved axially with respect to the other part, during the welding operation. Any suitable automatic means may be provided to terminate the relative rotation of the parts. If the pipe 274 is being rotated, some appropriate means such as for automatically shifting the gear 278 with respect to gear 276 could be used to stop the relative rotation at the proper time. If the machine 270 is used to rotate the fitting 290, some appropriate means could be provided to automatically release the chuck for turning movement after a given longitudinal relative movement of machine 270 toward housing 268. Various other means for the same purposes will be obvious to those skilled in the art.

Figure 30:
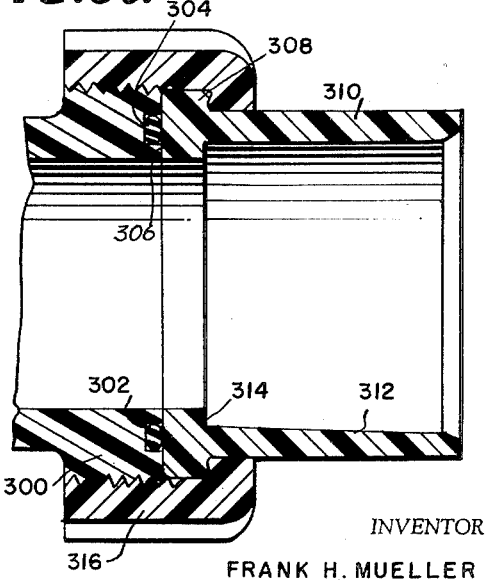
Figure 30 is a partial vertical axial sectional view through a form of outlet nipple on a plastic valve body or the like, showing the manner of attachment thereto of a plastic tailpiece to which a plastic pipe part may be welded.

Figure 30 shows an adaptation of the invention, which will be understood with reference to Figure 27, and the description thereof herein. In Figure 30, 300 indicates a plastic inlet or outlet nipple formed integrally with a plastic valve body, such as a valve body as designated 240 in Figure 27. It will be understood that such a plastic nipple may extend from opposite sides of such a valve or body. The end of this nipple is provided with a circular groove 302 adapted to receive a conventional O-ring 304, to form a pressure tight seal. Bearing against the end surface 306 of this nipple, and in sealing engagement therewith, by reason of the presence of the O-ring, is a flange 308 formed on the end of a plastic tailpiece 310. The plastic tailpiece is provided with the inwardly tapered socket 312, for friction welding, and the end abutment face 314, all as previously described. The tailpiece 310 is retained on the end of the nipple, and in sealing engagement therewith, by a plastic nut 316 which has an end flange engaging a shoulder on the inner end of the tailpiece 310. It will be understood that this tailpiece is formed with a socket, whereby it may be friction welded onto the end of a plastic pipe, all in the manner herein described, and this tailpiece may be designed in any suitable form, and provided with slots and abutments, to receive a driving implement carried on such as a drilling machine, to rotate the tailpiece at high speed with respect to the end of a pipe part, in order to weld same into the socket 312, all as previously described.

It will be apparent, from considering the description of Figure 27, that tailpieces 310 having sockets of various sizes may be attached to the end of the nipple 300, to receive various sizes of plastic pipes. The tailpiece may be friction welded to the end of a pipe, and then attached in sealing engagement with the nipple 300, by the securing nut 316, sealing engagement being insured by the presence of the O-ring 304.

I claim:

1. The method of welding to a plastic fitting part a plastic pipe part having an end section of substantially uniform outside diameter terminating in a substantially flat annular end face, the steps comprising: forming in the fitting part an elongated slightly-inwardly-tapering socket having a depth approximating the diameter of said pipe part end section, an interior diameter at its outer end at least as great as the outside diameter of said pipe part end section, and an inner section of substantial length which extends outwardly from the bottom of said socket and has a maximum diameter less than the outside diameter of said pipe part end section; inserting said pipe part end section into said socket until said end section is annularly engaged with the side wall of said socket at the outer end of said inner socket section; rotating one of said parts at high speed relative to the other to develop frictional heat between, and thereby soften, the annular engaged surfaces of said parts; effecting forceful telescoping relative movement between said socket and said pipe part end section while continuing said rotation to thereby enlarge the axial extent of said engaged and softened surfaces; and discontinuing said relative rotational and telescoping movements when the plastic materials of said parts have become bonded and welded to one another along said engaged and softened surfaces.

2. The method defined in claim 1 wherein the socket is formed with a taper of the order of 1.8°.

3. The method as defined in claim 1 wherein the rotating step is accomplished by rotating one part while yieldably restraining the other part against rotation with a predetermined force, and wherein the discontinuing step is effected by overcoming said restraining force as a result of the bonding together of the material of said parts so that said other part rotates with said one part.

4. The method defined in claim 3 wherein the step of yieldably restraining the other part against rotation is effected by hand.

5. The method of welding to a plastic fitting part a plastic pipe part having an end section of substantially uniform outside diameter terminating in a substantially flat annular end face, the steps comprising: forming in the fitting part an elongated slightly-inwardly-tapering socket having a depth approximating the diameter of said pipe part end section, an interior diameter at its outer end at least as great as the outside diameter of said pipe part end section, and an inner section of substantial length which extends outwardly from the bottom of said socket and has a maximum diameter less than the outside diameter of said pipe part end section; inserting said pipe part end section into said socket until said end section is annularly engaged with the side wall of said socket at the outer end of said inner socket section; rotating one of said parts at high speed while yieldably restraining the other part against rotation with a predetermined force to develop frictional heat between, and thereby soften, the annular engaged surfaces of said parts; effecting forceful telescoping relative movement between said socket and said pipe part end section while continuing said rotation to thereby enlarge the axial extent of said engaged and softened surfaces; and continuing to rotate said one part and to effect said telescoping relative movement until said restraining force is overcome as a result of the material of said parts becoming bonded and welded to one another throughout the entire area of said engaged and softened surfaces.

6. The method defined in claim 5 in which the restraining step is accomplished by hand.

7. The method defined in claim 5 in which the socket is formed with a taper of the order of 1.8°.

8. The method of welding to a plastic pipe part, having an end section of substantially uniform outside diameter terminating in a substantially flat annular end face, a plastic fitting part provided with an elongated slightly-inwardly-tapering socket having an interior diameter at its outer end at least as great as the outside diameter of said pipe part end section and an inner section of substantial length which extends outwardly from the bottom of said socket and has a maximum diameter less than the outside diameter of said pipe part end section, the steps comprising: inserting said pipe part end section into said socket until said end section is annularly engaged with the side wall of said socket at the outer end of said inner socket section; rotating one of said parts at high speed while manually restraining the other part against rotation in order to develop frictional heat between, and thereby soften, the annular engaged surfaces of said parts; manually effecting forceful telescoping relative movement between said socket and said pipe part end section while continuing said rotation to thereby enlarge the axial extent of said engaged and softened surfaces; and continuing to rotate said one part and to effect said telescoping relative movement until the manual restraint of the other part against rotation is overcome as a result of the material of said parts becoming bonded and welded to one another throughout the entire area of their engaged and softened surfaces.

9. The method of welding to a plastic pipe part, having an end section of substantially uniform outside diameter terminating in a substantially flat annular end face, a plastic fitting part provided with an elongated slightly-inwardly-tapering socket having a depth approximating the diameter of said pipe part end section, an interior diameter at its outer end at least as great as the outside diameter of said pipe part end section, and an inner section of substantial length which extends outwardly from the bottom of said socket and has a maximum diameter less than the outside diameter of said pipe part end section, the steps comprising: inserting said pipe part end section into said socket until said end section is annularly engaged with the side wall of said socket at the outer end of said inner socket section; rotating one of said parts at high speed while manually restraining the other part against rotation in order to develop frictional heat between, and thereby soften, the annular engaged surfaces of said parts; and manually effecting forceful telescoping relative movement between said socket and said pipe part end section, while continuing said rotation, until said end face of said pipe part end section substantially contacts the bottom of said socket, thereby increasing the axial extent of said engaged and softened surfaces to substantially that of said socket inner section, whereby said parts will become bonded and welded to one another throughout the entire area of said engaged and softened surfaces sufficiently to overcome the manual restraining of said other part.

References Cited in the file of this patent

UNITED STATES PATENTS

| | | |
|---|---|---|
| 444,721 | Bevington | Jan. 13, 1891 |
| 2,143,568 | Munro | Jan. 10, 1939 |
| 2,399,592 | Bradshaw | Apr. 30, 1946 |
| 2,441,940 | Rohdin | May 18, 1948 |
| 2,444,150 | Best | June 28, 1948 |
| 2,498,831 | Veitch | Feb. 28, 1950 |
| 2,596,020 | Fletcher | May 6, 1952 |
| 2,702,715 | Andrews | Feb. 22, 1955 |
| 2,776,151 | Harkenrider | Jan. 1, 1957 |
| 2,779,998 | Bailey | Feb. 5, 1957 |

FOREIGN PATENTS

| | | |
|---|---|---|
| 572,789 | Great Britain | Oct. 24, 1942 |

OTHER REFERENCES

Mod. Plastics, November 1945, pages 142–145.
Plastics, December 1945, pages 64, 66–67, 113–115.